United States Patent [19]

North, Jr.

[11] 3,963,151

[45] June 15, 1976

[54] FLUID DISPENSING SYSTEM

[75] Inventor: Howard Lincoln North, Jr., Newfoundland, N.J.

[73] Assignee: Becton, Dickinson and Company, East Rutherford, N.J.

[22] Filed: Aug. 5, 1974

[21] Appl. No.: 492,031

[52] U.S. Cl. ............................. 222/309; 222/334; 222/340; 222/380; 251/9
[51] Int. Cl.² ...................................... G01F 11/06
[58] Field of Search ........... 222/309, 334, 340, 341, 222/378, 380, 382, 464, 108, 109; 251/9, 10; 417/471; 141/116, 117

[56] References Cited
UNITED STATES PATENTS

| | | | |
|---|---|---|---|
| 3,381,845 | 5/1968 | MacDonald | 222/464 X |
| 3,447,576 | 6/1969 | Gronlund | 222/334 X |
| 3,626,999 | 12/1971 | Jones | 222/309 |

*Primary Examiner*—Allen N. Knowles
*Attorney, Agent, or Firm*—Kane, Dalsimer, Kane, Sullivan and Kurucz

[57] ABSTRACT

A fluid dispensing system for accurately dispensing precise aliquots of fluid rapidly and efficiently. The system includes a reservoir of fluid and a pump adapted for connection to a reservoir of fluid and for transferring precise aliquots of fluid from the reservoir to an outlet orifice. An inlet tube is provided with a bore therethrough and one open end for fluid communication with a reservoir and the other open end in fluid communication with the pump. An outlet tube is provided having a bore therethrough with one open end forming the outlet orifice for the system and the other open end in fluid communication with the pump. Controls are connected to the pump to precisely regulate the amount of fluid in an aliquot transferred from a reservoir through the inlet tube, pump and outlet tube to the outlet orifice during an operating cycle of the pump. Finally, a valve assembly is in the system associated with the inlet and outlet tubes and the pumps so as to normally close the bores in the tubes and to automatically shift to open the inlet tube while maintaining the closed outlet tube when the pump draws a precise aliquot from a reservoir. The valve assembly automatically closes the bore of the inlet tube while opening the bore of the outlet tube when the pump dispenses the precise aliquot through the outlet orifice.

4 Claims, 8 Drawing Figures

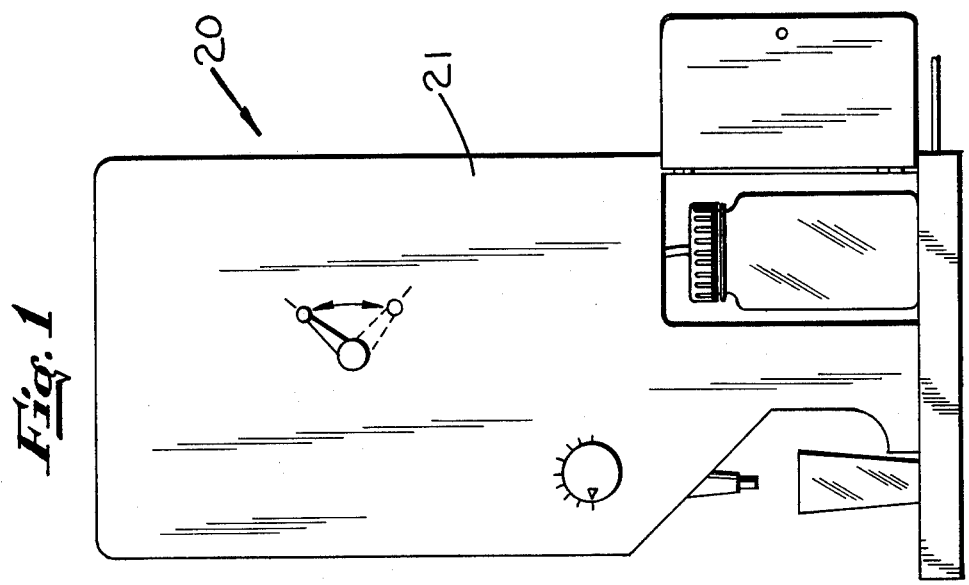
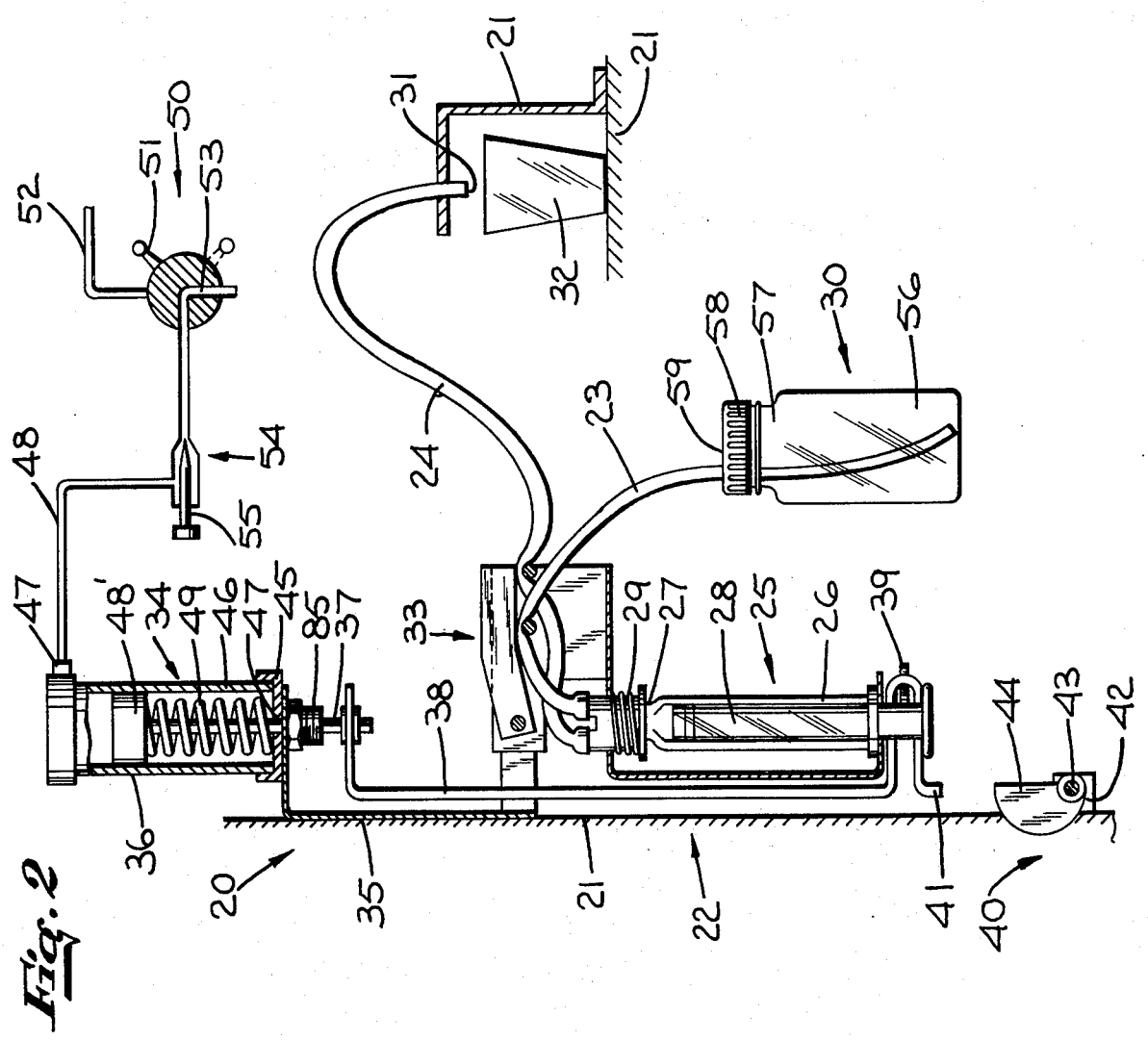

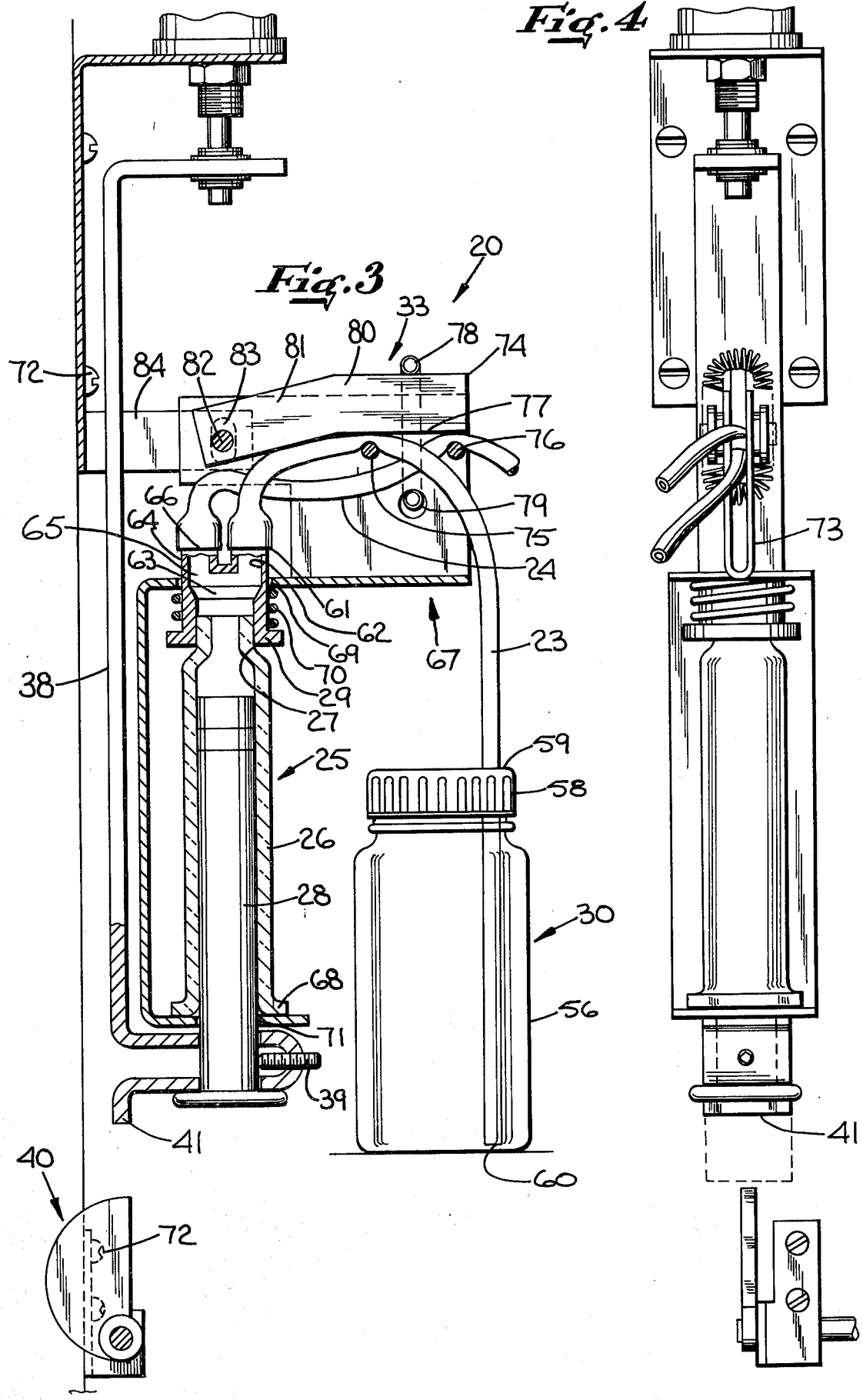

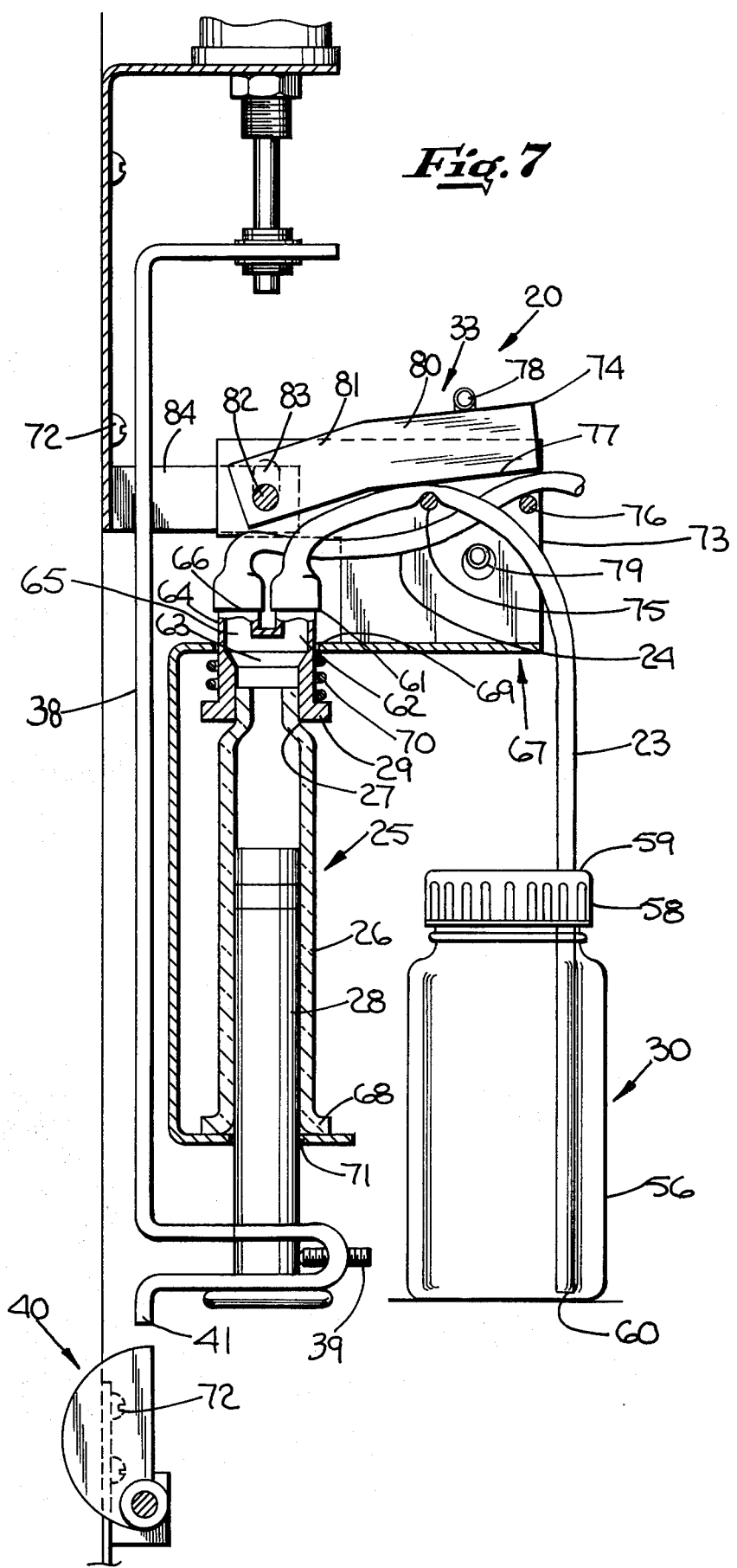

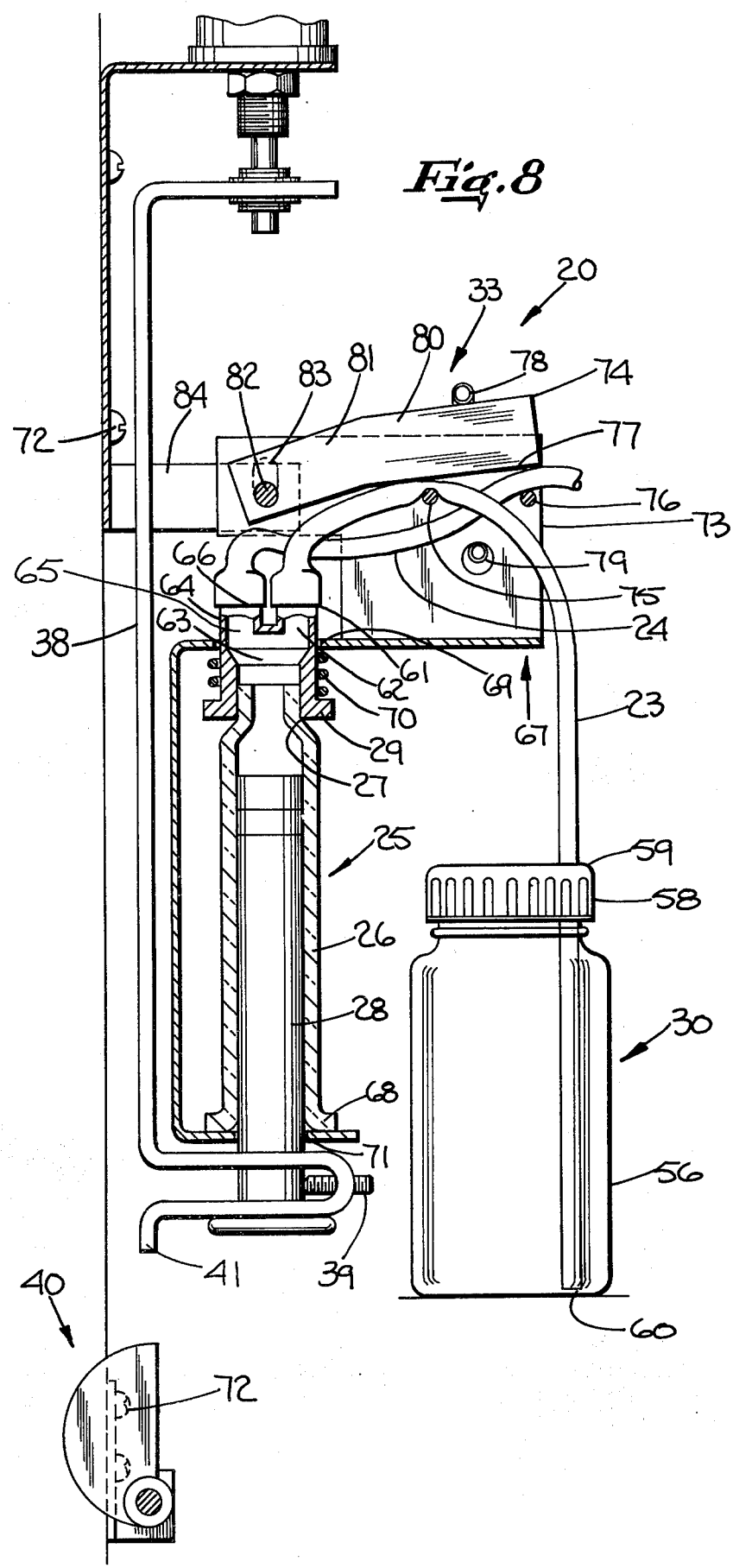

FLUID DISPENSING SYSTEM

BACKGROUND OF THE INVENTION

Dispensing systems are well known in many environments for many purposes. In certain instances it is very desirable to have very precise aliquots of fluid dispensed accurately and efficiently upon demand. The individual aliquots may range from very minute volumes to quite large volumes. Naturally there are many difficulties encountered when transferring fluid. For example, it is important that an exact amount or volume of fluid for an aliquot is introduced to the system from the supply source, that no fluid is lost from the aliquot during transportation through the system, and that the precise amount is dispensed from the dispensing orifice as that introduced from the fluid source. In handling fluid there are many well known problems that could result in loss of fluid during transfer or in an inaccurate dispensing function whee too much fluid is dispensed.

One particular environment that relies on the precise dispensing of aliquots of fluid is the medical field. This is particularly true where reagents are to be dispensed in precise amounts for clinical testing. With modern day equipment where high speed, high automated systems are employed to test a multiplicity of samples in rapid and repeated fashion, it is imperative that a quick acting pump be provided for precisely transferring aliquots of reagent in either large or small amounts quickly and efficiently into the highly automated system. It should be kept in mind that even in the case of individual tests, independent of highly automated clinical testing systems, it is important that very accurate and precise amounts of fluid such as reagent are dispened for accurate testing results.

Other environments can be readily envisioned where precise amounts of fluid must be handled and dispensed, particularly in the chemical testing area. It is readily apparent that there are many applications where very precise fluid dispensing structures are desirable and advantageous.

SUMMARY OF THE INVENTION

With the above background in mind, it is among the primary objectives of the present system to provide a fluid dispensing system for accurately dispensing precise aliquots of fluid rapidly and efficiently into a receiving well. The system is designed for use in chemical and medical applications either independently or in cooperation with a highly sophisticated automated clinical analyzing system. The structure is of low cost design of a simple construction which may be quickly and efficiently utilized in an accurate fashion and is readily adaptable for use in many environments where precise aliquots of fluid are to be handled and dispensed.

Among the general environments to which the present dispensing system is adaptable is for use in dispensing concentrated acids and alkalies, amines, solvents, and similar fluids with selectable volumes and with high precision. The system provides rapid dispensing, long life of the parts, high reliability and low cost. It is designed for simple set-up, priming, draining and flushing of a multiplicity of pumps such as might be employed in an automated clinical analyzer system.

As envisioned, part of the system would include a syringe of inert material such as a borosilicate glass barrel with a polytetrafluoroethylene plunger seal and with inlet and outlet valves to form the basic pump. The valves are formed by occlusion and release of thin-walled, small lumen, polypropylene, polyethylene or similar material tubing used to bring fluid into the pump or carry it away. The tubing valve is spring loaded so that in the relaxed position both the inlet and the outlet tubes are closed. When the syringe plunger is moved, the valve is mechanically operated before the plunger moves in the syringe barrel. On intake, the intake tubing is open while the discharge tubing remains closed and fluid is drawn into the syringe from the reservoir. On discharge, the tubing occlusions are reversed and fluid is pumped from the syringe through the discharge tubing and into the receiver vessel.

The pump is provided with rigid motion stops to repeatedly establish the plunger volume displacement. Since the tubing valves are dead tight, even to gas, the displaced volume is the volume delivered by the pump.

The pump is also provided with a pneumatic cylinder to stroke the syringe plunger. This operating cylinder is velocity regulated by means of a speed control orifice in one of the cylinder supply lines and by means of a regulated supply air pressure. The syringe plunger velocity is sufficiently high to produce a solid stream flow from the discharge tubing instead of forming discrete droplets. Droplets can produce poor precision with small pumped volumes. The drop becomes a variable volume storage reservoir and for accurate/precise metering of small volumes must be eliminated. Expelling the metered fluid at a sufficiently high velocity so that a jet is formed rather than drops is satisfactory for this purpose. Control of the velocity produces uniform dynamic conditions during the discharge period and this in turn produces uniform fluid residue at the discharge end of the tubing. When the fluid flow is suddenly stopped the fluid momentum within the tubes causes the fluid to overshoot and then withdraw back into the tubing slightly. With the velocity selected and tubing lengths of one or two meters the residue is negative, that is the tube end is void of reagent and is filled with air for five to ten millimeters of tubing length from the end. In very short discharge tubes of about five centimeters length, the residue is stil negative and the void reduces to about 1 millimeter. This negative residue tends to isolate the fluid from the atmosphere and reduces changes in the fluid due to evaporation of constituents or water absorption from the air. The pump can also be operated manually and could be operated by other means such as electric motors, mechanical cams, or electric solenoids.

It is conceivable that the pump system can be provided with an accessory to permit fast filling or fast flushing. The accessory will provide means to actuate the pump or group of pumps in rapid sequence of rates of forty to sixty cycles per minute and thus rapidly prime a pump with reagent or flush it with washing fluid.

The tubing can be either polyethylene or similar material such as polypropylene. It is advantageous to utilize a polyolefin tubing with occlusion means to form the valve. Polyvinyl chloride, rubber or other flexible tubing suitable for the chemicals involved can also be employed. Additional durability is possible by preforming the tubing at the occlusion points. Utilization of a controlled discharge flow rate large enough to avoid droplet formation at the discharge orifice and thus to obtain high precision with small volumes is of considerable value in various arts including the medical field.

It is conceivable to use the basic pump disclosed herein for dispensing premeasured reagents or biological preparations into vials or containers at the point of manufacture. Also the pump could be utilized for dispensing reagents or diluents in connection with an automatic clinical analyzer. Furthermore, the pump can be utilized for dispensing reagents or diluents in any chemistry laboratory either manually or at the touch of a button. The system including the pump is of value in performing sample aliquoting and diluting. This procedure naturally would require two pump units, one for each sample volume and the other for the diluent volume.

In a larger version of the pump of this system it could be used as a low hemolysis, pulsatile, perfusion pump for use in heart/lung bypass in conjunction with the blood oxygenator. In a tandem version the basic pump could provide nearly continuous flow to perfuse blood or dialysate through a hemodialyzer.

The pump of this system is adaptable for use in pumping any extremely corrosive liquid with precision and for pumping intravenous infusion fluids at low flow rates with precision. In a smaller version, the pump could be utilized to pump liquid at high pressure through chromatography columns.

In all of the above applications discussed and considered, it should be kept in mind that the entire system is of low cost in manufacture and use.

In summary, a system is provided for accurately dispensing precise aliquots of fluid rapidly and efficiently. Fluid is passed in precise aliquots from a reservoir to a pump and then is transferred in the same precise aliquots from the pump to a dispensing orifice. The pump cycle is regulated so that the precise aliquot of fluid is passed to the pump and transferred therefrom. The passage of the precise aliquot is controlled through valving of the inlet and outlet passages of the pump so that both passages are normally closed and only the inlet passage is open during the inlet cycle and only the outlet passage is open during the outlet cycle thereby assuring precise dispensing of the fluid during a dispensing cycle.

The structure of the system includes a pump for transferring precise aliquots of fluid from a reservoir to an outlet orifice. An inlet tube is provided with a bore therethrough and one open end adapted to be placed in fluid communication with a reservoir of fluid to be dispensed and another open end in fluid communication with the pump. An outlet tube is provided with a bore therethrough and an open end forming the outlet orifice for the system and another open end in fluid communication with the pump. Control means are connected to the pump to precisely regulate the amount of fluid in an aliquot transferred through the inlet tube, pump and outlet tube to the outlet orifice during an operating cycle of the pump. Finally, a valve assembly is in the system associated with the inlet and outlet tubes and the pump so as to normally close the bores in the tubes. The valve assembly is adapted to automatically shift to open the inlet tube while maintaining the closed outlet tube when the pump draws a precise aliquot. The valve assembly is adapted to automatically close the bore of the inlet tube while opening the bore of the outlet tube when the pump dispenses the precise aliquot through the outlet orifice.

With the above objects, among other, in mind, reference is had to the attached drawings.

BRIEF DESCRIPTION OF THE DRAWINGS

In the drawings:

FIG. 1 is an elevation view of the system shown in an appropriate housing;

FIG. 2 is a schematic view of the components of the system;

FIG. 3 is a partially sectional fragmentary elevation view of the system showing the normal position with both the inlet and outlet tubes occluded;

FIG. 4 is an end elevation fragmentary view of the system showing the normal position with both the inlet and outlet tubes occluded;

FIG. 7 is a partially sectional fragmentary view of the system at the start of and during the dispensing stroke with the inlet tube occluded and the outlet tube open; and FIG. 8 is a partially sectional fragmentary view of the system at the end of the dispensing stroke with the inlet tube occluded and the outlet tube open.

DESCRIPTION OF THE PREFERRED EMBODIMENT

Figure 5:
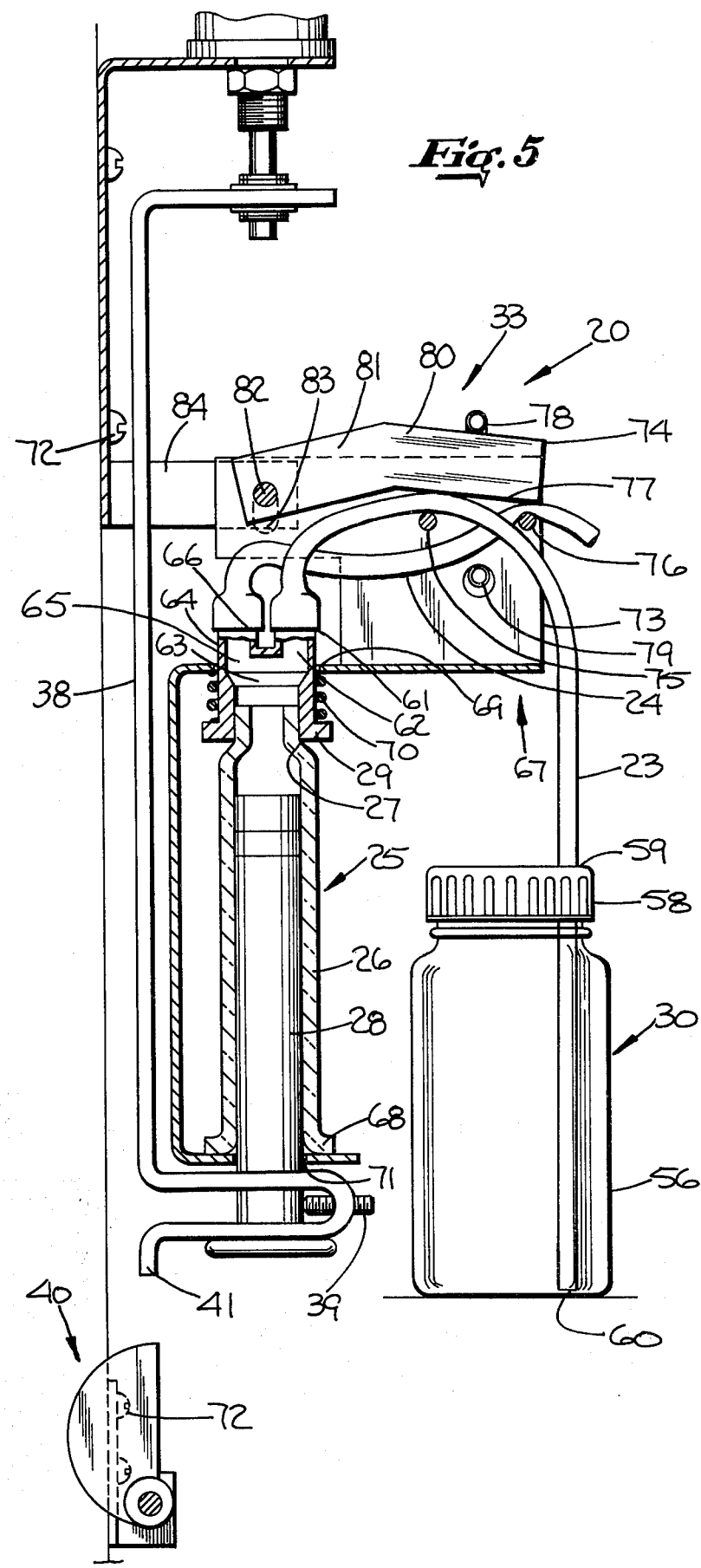
FIG. 5 is a partially sectional fragmentary view of the system showing the system at the start of the inlet stroke with the inlet tube open and the outlet tube occluded.

The dispensing system 20 is shown in schematic view in FIG. 2, in particular the interrelationship of the various components and is shown in FIG. 1 contained in a typical housing 21 for use independently in dispensing fluid in precise aliquots. Naturally, as discussed in detail above, the present system is designed for use in complex automated systems either singularly or in plural form as well as in use in a variety of different environments. However, for descriptive purposes in the present application, the system is shown within a housing 21 for use independently in dispensing precise sequenced aliquots of fluid upon demand.

In operational condition as shown in FIG. 2, pump 22 is mounted to housing 21 and includes an inlet tube 23, an outlet tube 24 and a syringe assembly 25. The syringe assembly includes a hollow barrel 26 with an opening at its rear end and a reduced forward tip 27 terminating in an opening at the opposing end. Reciprocally mounted within barrel 26 is a plunger 28 which sealingly engages the inner surface of barrel 26 as it reciprocates therein. A manifold 29 is frictionally mounted on reduced tip 27 to provide means for attaching both inlet tube 23 and outlet tube 24 to syringe 25.

Inlet tube 23 communicates between the syringe assembly 25 and a fluid reservoir 30 which supplies fluid for the dispensing operation. Outlet tube 24 is connected to syringe assembly 25 so as to provide communication between the syringe pump and an outlet orifice formed by the opening 31 in one end of outlet tube 24. Opening 31 which forms the outlet orifice is positioned so that it points vertically downward from housing 21 in position for fluid to flow therefrom into a receiving vessel or well 32 placed appropriately, as shown, on housing structure 21. Alternatively, line 24 could be hand-held for use in environments such as dispensing aliquots into test tubes in a rack. This procedure would eliminate the need for moving the test tubes to the dispenser which can often be more difficult and time consuming. It is also possible to provide for manual or automatic repositioning of the outlet tube to a multiplicity of receivers.

A valve assembly 33 is mounted on housing 21 and is positioned with respect to inlet tube 23 and outlet tube 24 so as to open and occlude the tubes in response to pumping action by syringe 25 as discussed in detail below.

A pneumatic cylinder 34 is mounted to housing 21 by means of an appropriate bracket 35 and includes a hollow air cylinder 36 and a reciprocally mounted piston 37 therein. Piston 37 is interconnected with syringe plunger 28 by means of guide bracket 38. The guide bracket is mounted to the portion of piston 37 outside of hollow cylinder 36 in fixed position so as to reciprocate with the piston. it is affixed to syringe plunger 28 by means of set screw 39.

A stop means 40 is provided to limit the retraction stroke of syringe plunger 28 by engagement with flange 41 of bracket 38. Stop means 40 includes a base 42 extending from the inner wall of housing 21, a pivot pin 43 mounted to base 42 and having the stop cam 44 rotatably mounted thereon. The outer surface of stop cam 44 has an arcuate configuration so as to adjust the upward projection of the stop cam 44 and therby adjusts the rearward stroke of plunger 28 since engagement between flange 41 and cam 44 limits the rearward stroke of the plunger.

Alternatively, support bracket 67 can be extended around and below the syringe and a threaded adjusting screw or similar adjustable device can be passed through the bracket 67 in substantial axial alignment with the plunger 28. Threaded interengagement between the screw and the bracket permits adjustment of the screw and the engagement between the rear end of the plunger and the front end of the screw forms a stop for the plunger thereby providing regulation of the stroke. Naturally, other well known devices can be employed for stroke adjustment in place of the micrometer screw.

Pneumatic cylinder 34 is comprised of a cap 45 frictionally interengaged with a barrel 46. An inlet opening 47 is at the upper end of barrel 46 and provides a convenient connector for fluid communication with a compressed air conduit 48. The cap 45 is rigidly mounted in any convenient fashion to bracket 35 which in turn is mounted to the housing. The cap 45 has a central opening 47 to permit passage of the piston rod 37 therethrough. The piston rod within cylinder 36 terminates in a plug 48' which sealingly engages with the inner walls of cylinder barrel 46. As stated above, the xposed end of piston 37 is connected to bracket 38 which in turn is connected to syringe plunger 28 so that reciprocation of piston 37 reciprocates plunger 28 in a corresponding manner. Piston 37 is of smaller diameter than the plug 48' on its inner terminal end so that a compression spring 49 is captured between the rear surface of plug 48' and the inner surface of cap 45. Therefore, when compressed air is received through compressed air conduit 48 within cylinder 36 it will engage plug 48 and drive piston 37 rearwardly thereby biasing compression spring 49. When the rearward stroke is completed by engagement with stop means 40 and the compressed air is shut off, the piston will be driven forward under the influence of biased compressed spring 49 to thereby expel the air through opening 47 and air conduit 48 and will, through interconnection with bracket 38, move piston 28 forward and dispense fluid from the system.

Well known alternatives can naturally be employed in place of pneumatic cylinder 34 such as electrical, mechanical, or hydraulic substitutes.

Several control means are positioned along conduit 48 to adjust flow of compressed air. An air inlet and exhaust valve 50 is provided with a manual handle 51 for shifting of the valve 50 between the air inlet and the air exhaust positions. A compressed air line 52 is in fluid communication with valve 50 at one end and connects with a conventional compressed air source (not shown) at the other end. When valve 50 is in the position shown in FIG. 2, the interior valve passageway 53 is in communication with cylinder 34 only so that air can be expelled through opening 47, conduit 48 and passageway 53 in the valve. When the valve is rotated to the position shown in phantom in FIG. 2, there will be direct communication between compressed air line 52 and inlet conduit 48. In that position, air will be directed through the interconnected conduits to the air cylinder where it will drive piston 37 rearwardly.

The amount of air being received is regulated by the speed controller or needle valve 54. As shown in FIG. 2, the manual needle 55 is in the open position permitting air to pass through the valve in both directions. Rotation of the manual needle in a conventional fashion opens and closes the passageway through the valve to adjust the flow of air through the system. In this manner, the amount of air introduced to cylinder 34 can be adjusted thereby adjusting the speed of reciprocation of piston 37 and accordingly the speed of reciprocation of plunger 28 thereby controlling the speed of the dispensing action.

Naturally, a conventional type automatic control can be provided for controlling entrance and exhaust of the compressed air and for controlling the speed of air flow in the system. This would be in place of the manual controls 50 and 54 in the depicted embodiment.

Resevoir 30 is a conventional type of vessel for holding fluids such as jar 56. A reduced neck portion 57 of the jar has a threaded outer surface to receive a cap 58 having a threaded inner surface. The interengagement of the threads between cap 58 and neck 57 facilitates removal and attachment of the cap when the reservoir requires refilling. A hole 59 is in the top of the cap for introduction of inlet tube 23.

FIGS. 3 and 4 depict system 20 in the normal off-position with no compressed air being introduced to the system and the inlet tube 23 and the outlet tube 24 being occluded so that no fluid is flowing through the system.

In assembling the components of the system to arrive at the normal operating condition, a reservoir of fluid 30 is provided and inlet tube 23 is introduced through opening 59 in cap 58 until its open end 60 is positioned adjacent the bottom of jar 56. The other open end 61 of inlet tube 23 is frictionally mounted on tubular projection 62 of manifold 29. Projection 62 has an opening therein to provide fluid communication between the interior of manifold 29 and the interior of inlet tube 23. Manifold 29 is frictionally engaged with the outer surface of reduced forward tip 27 of syringe barrel 26. The chamber 63 formed on the hollow interior of manifold 29 communicates with opening 62 and projection 61 and the interior of barrel 26. The manifold contains a second tubular projection 64 with an opening 65 therein communicating with chamber 63 and also communicating with the bore through outlet tube 24. The oopen end portion 66 of outlet tube 24 is frictionally mounted about the outer surface of projection 64 thereby providing fluid communication between the passageway in the outlet tube and the interior of manifold 27 and syringe barrel 26. The opposite end of outlet tube 24 containing outlet orifice 31 is positioned over the receiving well for the fluid to be dispensed as depicted in FIG. 2.

A support bracket assembly 67 is provided to hold valve assembly 33 and pump assembly 25. The rear surface 68 of syringe barrel 26 rests on a horizontal extending portion of bracket 67 so as to be supported in a vertical direction. The manifold 29 mounted about reduced forward tip 27 extends through an opening 69 in bracket assembly 67 in position to receive the inlet and outlet tube ends. A compression spring 70 surrounds the manifold outer surface between the undersurface of a portion of bracket assembly and surfaces formed by an annular flange on the manifold to resiliently assure proper positioning of the pump assembly 25 with respect to the bracket assembly 67 and to hold manifold 29 on the reduced forward tip 27.

Plunger 28 extends through an opening 71 in bracket assembly 67 which is large enough to permit the plunger 28 to freely reciprocate. Bracket 38 is mounted to the portion of plunger 28 below bracket assembl6 67 by means of removable set screw 39.

All of the brackets mounted on the supporting structure 21 can be mounted in any conventional fashion such as by the use of appropriate screws 72.

Valve assembly 33 incorporates portions of the bracket arrangement 67 for supporting surfaces. A U-shaped supporting portion 73 extends upwardly from the portion of the supporting bracket 67 through which manifold 29 extends. U-shaped portion 73 has its opening at the top. Positioned between the legs of portion 73 is a cam arm 74. The legs of U-shaped portion 73 are spaced so that cam arm 74 can shift and pivot. A pair of horizontal pins 75 and 76 are mounted to the legs of U-shaped portion 73 and extend therebetween. Pins 75 and 76 are positioned below the undersurface 77 of cam arm 74. Inlet tube 23 is passed over pin 75 so that the pin rests intermediate the ends of the tube. Similarly, outlet tube 24 is passed over pin 76 so that the pin rests intermediate the ends of the tube. Cam arm 74 tending to pivot downwardly engages with tubes 23 and 24 and directs the tubes against pin 75 and 76. For compression of the tubes and occluding of the passageway therethrough in the normal position, a garter spring 78 is passed about cam arm 74 and through aligned opening 79 in U-shaped portion 73. Sufficient force is applied by the garter spring 78 so that the flexible tubes 23 and 24 are compressed until the passageways therethrough are occluded thereby prohibiting flow of fluid through either tube.

Cam arm 74 includes tow angularly positioned legs 80 and 81. The forward leg 80 normally rests in a substantially horizontal position as depicted in FIGS. 3 and 4 with its undersurface 77 forming the engaging surface for occluding tubes 23 and 24 against pins 75 ad 76 respectively. The rear leg 81 is angled with respect to forward leg 80 so as to extend slightly downwardly and has a mounting pivot or pin 82 passed horizontally therethrough adjacent its rear edge. Pin or pivot 82 is mounted in a pair of opposed vertical slots 83 in U-shaped portion 73 which permits the pivot pin 82 to be shifted a predetermined vertical distance during operation of the system as well as permitting the cam arm to rotate. In this manner, cam arm 74 is permitted to be shifted in response to shifting of pivot pin 82 while retaining its ability to be rotated about the pivot pin 82 with its axis of rotation depending upon the location of the pivot pin within slots 83. Slots 83 are formed in U-shaped portion 73 and the pin 82 is passed therethrough and is mounted in a pair of opposed holes in bracket portion 84. Portions 84 extend substantially horizontally with respect to the side wall of housing 21 so that the slots 83 are located approximately above manifold 29. In the normal position, as shown in FIGS. 3 and 4, pivot pin 82 is located approximately in the vertical center of slots 83 with both tubes being occluded by arm 74 with the assistance of garter spring 78.

Stop means 40 is then positioned as shown to regulate the rearward stroke of plunger 28 and compressed air is connected to inlet tube 52. The system is then in condition for dispensing fluid upon demand. Compressed air is introduced through inlet passage 52 by manually shifting lever 51 so that passageway 53 provides communication between passageway 52 and passageway 48 into the system. The amount of air entering is adjusted by the speed controller 54. The air enters pneumatic cylinder 36 and engages with the exposed surface of piston plug 48'. The air forces piston 37 downwardly thereby biasing compression spring 49. As piston 37 moves downwardly under the force of compressed air, bracket 38 interconnecting piston 37 with plunger 28 causes plunger 28 to correspondingly move rearwardly. As this motion is started, plunger 28 moving rearwardly caises a vacuum within syringe barrel 26 and draws fluid through inlet tube 23. The pressure developed is sufficient to dispense cam arm 33 upwardly within U-shaped member 73 and lift leg 80 off inlet tube 23 thereby opening tube 23 and permitting flow through tube 23. The movement of cam arm 33 is against its own weight and the force of garter spring 78 as fluid begins to flow through tube 23. The pressure is provided by friction between the plunger 28 and barrel 26 together with the vacuum developed. The configuration of the cam arm and the relative position of pins 75 and 76 cooperate with the ability of the pivot pin 82 to shift in slots 83 so that the pin slides upward in slot 83. In this manner, the forward portion of leg 80 is retained in occluding engagement with outlet tube 24 with the assistance of garter springs 78. Therefore, from the outset of the intake stroke until it is completed the passageway through inlet tube 23 is open and the passageway through outlet tube 24 is occluded.

Figure 6:
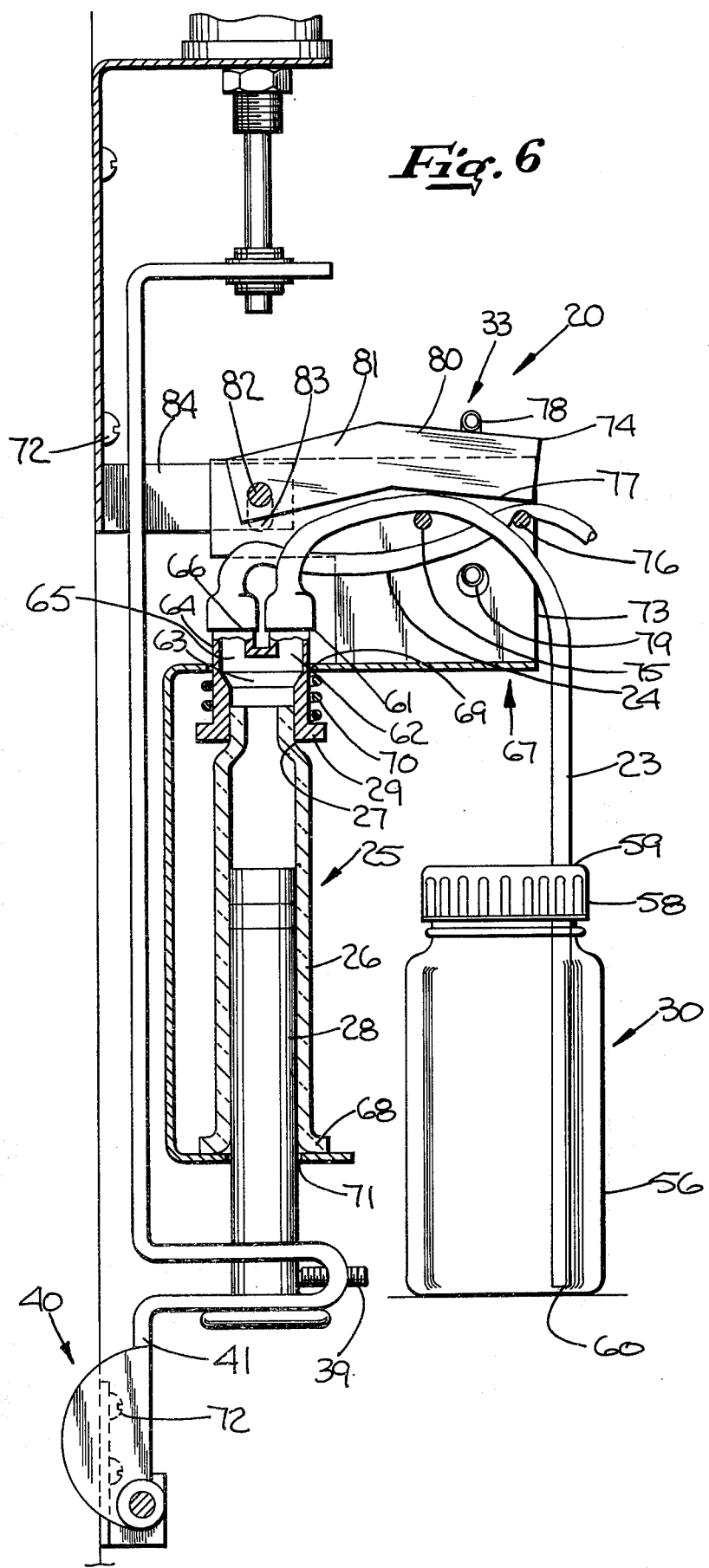
FIG. 6 is a partially sectional fragmentary view of the system with the inlet stroke complete and the inlet tube open and the outlet tube occluded.

The inlet stroke continues under the force of compressed air in the same manner as described above until the downward stroke reaches the point depicted in FIG. 6. At that time, flange 41 will be in engagement with stop means 40 thereby limiting the stroke at that point. No additional fluid can be drawn into the syringe barrel and the precise amount of fluid is contained within the system for a dispensing operation.

Thereafter, the compressed air switch or valve 50 is switched to the position shown in FIG. 1 which brings the passageway therethrough into alignment with conduit 48 only and open to the atmosphere to permit an air exhaust for the air contained within cylinder 36 through conduit 48. There is no longer an open conduit to the compressed air line 52. Biased compression spring 49 will then return piston 37 toward its original normal position while simultaneously moving interconnected plunger rod 28 forward. Initiation of this action causes fluid to be projected through manifold projection opening 65 and through outlet tube 24. The force of this fluid together with the friction between plunger 28 and barrel 26 raises the outward end of leg 80 of the cam arm upward against the bias of garter spring 78 thereby pivoting and shifting the cam arm so that pivot pin 82 is shifted downward in slots 83 to the bottom extremity as shown in FIG. 7. In this position, the cam arm 74 with the assistance of garter spring 78 will once again occlude inlet tube 23 by pinching it against pin 75. In contrast, cam arm 74 will be upwardly displaced from outlet tube 24 thereby providing free passageway through the outlet tube as the fluid is dispensed therethrough to the outlet orifice 31 at the end of the outlet tube and into the receiving well 32.

This stroke will continue until the spring 49 has returned piston 37 to its original position as determined by contact between bracket 38 and bracket 67 at the bottom end of syringe barrel 26. At that point the plunger 28 will be fully returned to its initial position within plunger barrel 26 through the interconnection of bracket 38. The precise aliquot of fluid which had been drawn into the system on the inlet stroke will have been fully dispensed through the outlet tube by the end of the outlet stroke. FIG. 8 depicts the system just prior to the end of the outlet stroke. Thereafter, the cam arm remains as shown in FIG. 8 until the intake stroke is begun. The occlusion of the inlet tube is sufficient to prevent backflow or siphoning in the outlet tube.

As discussed above, the length of inlet and outlet tubes 23 and 24 respectively are sufficient to assure proper movement of the fluid and the speed controller is adjusted so that a steady stream of fluid is drawn on the intake stroke and dispensed on the outlet stroke. Maintaining the tubes in the occluded condition between dispensing operations maintains the integrity of this system and assures that the precise amount drawn in on the intake stroke is dispensed on the outlet stroke. The system is a closed system with the exception of the inlet tube being open during the inlet stroke and the outlet tube being open during the dispensing stroke.

It should be kept in mind that valve assembly 33 can be replaced by conventional electrical, pneumatic hydraulic actuators to accomplish the same result. Also, the syringe can be replaced by other well known variable volume devices such as bellows and diaphragm structures.

All of the plastic components in the structure can be constructed of commonly utilized materials in the general polymer and elastomer fields with the particular element of structure determining the particular material.

Thus, the above discussed objectives, among others, are effectively attained.

What is claimed is:

1. A fluid dispensing system for accurately dispensing precise aliquots of fluid rapidly and efficiently comprising:
    a pump adapted to be connected to a reservoir of fluid for transferring precise aliquots of fluid from the reservoir to an outlet orifice for dispensing fluid from the system upon demand;
    an inlet tube having a bore therethrough and one open end for fluid communication with a reservoir and the other open end in fluid communication with the pump;
    an outlet tube having a bore therethrough and one open end forming the outlet orifice for the system and the other open end in fluid communication with the pump;
    control means connected to the pump to precisely regulate the amount of fluid in an aliquot transferred from a reservoir through the inlet tube, pump and outlet tube to the outlet orifice during an operating cycle of the pump;
    a valve assembly in the system associated with the inlet and outlet tubes and the pump so as to normally close the bores in the tubes and to automatically shift to open the inlet tube while maintaining the closed outlet tube when the pump draws a precise aliquot from a reservoir, and to automatically close the bore of the inlet tube while opening the bore of the outlet tube when the pump dispenses the precise aliquot through the outlet orifice;
    the inlet and outlet tubes being flexible elongated members; and
    the valve assembly including a supporting member, a pair of pins extending laterally from the supporting member, the inlet tube resting on one of the pins and the outlet tube resting on the other of the pins, a cam arm pivotally mounted on the support and positioned so as to normally compress the inlet and outlet tubes, the arm being slidable and pivotable so as to be moved to a first acting position wherein the inlet tube is open to permit fluid to flow therethrough while the outlet tube is retained in the closed position and the arm being movable to a second acting position where the inlet tube is retained in closed position and the outlet tube is open to permit fluid to flow therethrough.

2. The invention in accordance with claim 1 wherein the cam arm includes a pair of angularly positioned legs, one leg being mounted to the supporting structure by a horizontally disposed pin lodged in a pair of opposed vertical slots in the supporting structure so that the pin is rotatable within said slots and the supporting structure is reciprocally slidable in a vertical direction a predetermined distance, the other of the legs having an undersurface in engagement with the inlet and outlet tubes so that the tubes are captured between the undersurface of the other leg and the pins, garter spring surrounding the other of the legs and affixed to the supporting structure so as to normally bias the other of the legs in the direction of the pins thereby normally compressing the flexible inlet and outlet tubes between the undersurface of the other leg and the pins and shutting off the flow passages therethrough, the pivot pin being shiftable in the slot so that when the pump is activated to draw fluid through the inlet tube the legs of the cam arm will be shifted against the normal biasing force of the garter spring so as to permit fluid flow through the inlet tube while retaining the outlet tube in closed condition and when the pump is activated to dispense fluid the cam arm and legs will be appropriately shifted against the bias of the garter spring and by movement of the pivot pin within the slot so that the outlet tube is open for fluid to flow and the inlet tube is closed by the force applied between the other leg and the pin on which the inlet tube rests.

3. A method for accurately dispensing precise aliquots of fluid rapidly and efficiently comprising:

passing a precise aliquot of fluid from a reservoir into a pump;

transferring the precise aliquot from the pump to a dispensing orifice;

regulating the pump cycle so that the precise aliquot of fluid is passed to the pump and transferred therefrom;

controlling the passage of the precise aliquot through valving of the inlet and outlet passages of the pump so that both passages are normally closed and only the inlet passages open during the inlet cycle and only the outlet passage during the outlet cycle thereby assuring precise dispensing of the fluid during a dispensing cycle;

the passage of the aliquot of fluid from the reservoir to the pump being accomplished by directing the fluid through a tubular inlet member having a bore therethrough and openings at both ends, and the aliquot is passed from the pump to the dispensing orifice through an outlet tubular member having a bore therethrough and openings at both ends, the inlet and outlet tubes being of predetermined length and flexibility to facilitate control of precise amounts of fluid through the system; and the valving of the inlet and outlet tubes being facilitated by the provision of a cam arm on a supporting structure which is pivotally and slidably mounted, a pair of pins on the supporting structure extending laterally therefrom, the inlet tube resting on one of the pins and the outlet tube resting on the other of the pins, the cam arm normally engaging the outlet and inlet tubes and compressing them against the pins thereby occluding the passageways therethrough, the arm being shiftable and pivotable during the passage of the aliquot of fluid from the reservoir to the pump so as to open the passageway through the inlet tube while retaining the passageway through the outlet tube in closed condition and being shiftable and pivotal during transfer of the aliquot from the pump to the dispensing orifice so as to open the passageway through the outlet tube while retaining the passageway through the inlet tube in occluded condition.

4. The invention in accordance with claim 3 wherein the cam arm is mounted to the supporting structure by means of a pin extendable through a pair of opposed vertical slots of predetermined length to provide the necessary freedom to shift and pivot for the cam arm, and the cam arm including a pair of angularly extending legs with one leg containing the pin mounted to the supporting structure and the other leg containing an engaging undersurface for compressing the inlet and outlet tube against the pins, a garter spring on the supporting surface and surrounding the cam arm so as to normally direct the cam arm into tight interengagement with the tubes and the pins so as to occlude the openings therethrough.

* * * * *